Patented June 27, 1933

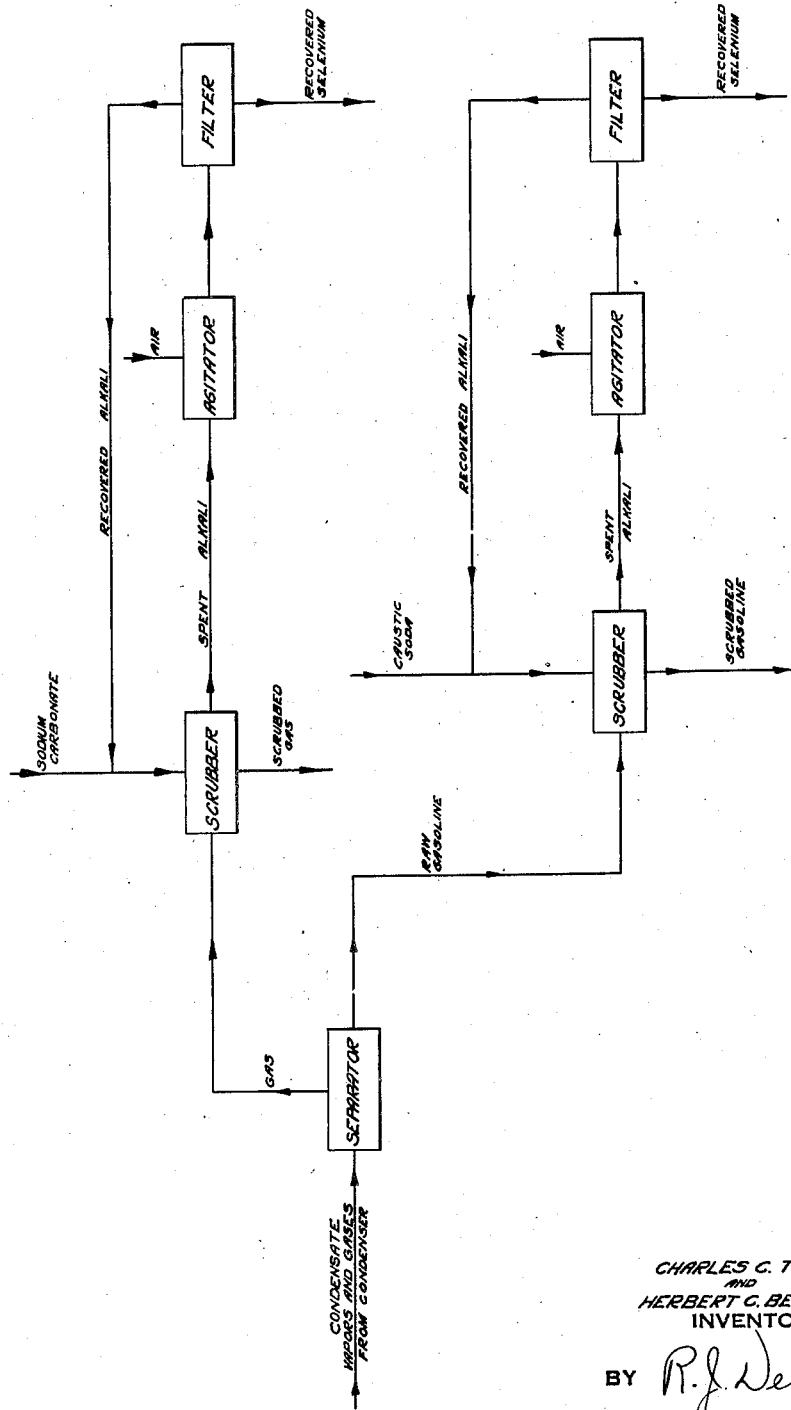

1,915,703

UNITED STATES PATENT OFFICE

CHARLES C. TOWNE, OF POUGHKEEPSIE, AND HERBERT C. BECKER, OF BEACON, NEW YORK, ASSIGNORS TO THE TEXAS COMPANY, OF NEW YORK, N. Y., A CORPORATION OF DELAWARE

RECOVERY OF SPENT SELENIUM

Application filed May 18, 1932. Serial No. 612,120.

This invention relates to the recovery of spent selenium from the products of conversion obtained in the pyrolysis of hydrocarbons in the presence of selenium. The object of the invention is to recover the spent selenium in a form suitable for reuse.

In accordance with the invention, the conversion products, such as naphtha and uncondensable gases, resulting from the pyrolysis operation, are contacted with an aqueous alkaline solution, whereby the volatile spent selenium is extracted as alkali soluble compounds by the solution and then the extracted compounds are oxidized to precipitate free selenium.

In the treatment of hydrocarbon oils and gases to effect conversion thereof into products suitable for the manufacture of motor fuel it is often advantageous to carry out the operations in the presence of selenium, as disclosed in the copending applications of Charles C. Towne: Serial No. 591,306, filed February 6, 1932 and Serial No. 607,755 filed April 27, 1932; and a copending application of Charles C. Towne and LeRoy G. Story, Serial No. 607,754, filed April 27, 1932. Such a treatment usually causes a substantial amount of reaction between the selenium and hydrocarbons or hydrogen formed in the process, with the formation of compounds of selenium, such as hydrogen selenide, alkyl selenides and alkyl hydroselenides. These compounds are mostly volatile substances which vaporize along with the conversion products and escape in the uncondensable gases or partially dissolve in the distillate. The loss of these compounds is economically undesirable because of the value of the contained selenium.

By means of our invention it is possible substantially completely to recover the spent selenium in the volatile conversion products in a form suitable for reuse as a catalyst or conversion agent by a simple and inexpensive method. By our process the conversion products, preferably the lighter portion thereof, such as the naphtha, uncondensable gases, or both, are contacted or scrubbed, in a counterflow apparatus or otherwise, with an alkaline solution adapted to extract the selenium from the hydrocarbons. The selenium is extracted by the alkali in the form of a salt or a selenide which is ordinarily soluble in the alkaline solution. The solution containing the selenium is then subjected to an oxidation reaction by agitating the solution with an oxidizing agent, such as hydrogen peroxide, oxygen, air, or other oxygen-containing gas. The selenium compounds are oxidized and free selenium is precipitated in a granular form and may be filtered from the solution. The alkaline solution, after the separation of the precipitated selenium, may be used over again for scrubbing additional hydrocarbons.

The drawing is a flow chart showing the application of the process to the recovery of selenium from the gases and the condensate recovered from the final condenser in a conversion process.

An example will now be given of the operation of our process as applied to the recovery of selenium from the cracked products obtained in the reforming of naphtha, wherein a straight run naphtha of about 40 octane number was reformed into about 78% of a motor fuel having about the same boiling point but 78 octane number, 2% of polymers, and the remainder of uncondensable gases. The gases from the operation were washed with about 1 barrel of 5% soda ash per thousand cubic feet and the naphtha was washed with about 1 gallon per barrel of 10% caustic solution. The soda ash and caustic solutions were then blown with air at approximately 150° F. until the selenium was substantially entirely precipitated as indicated by the complete loss of the red color of the solution, which required, in this case, about one hour. Approximately 90% of the selenium in the solution, equivalent to about 10% of that originally used in the reforming operation, was recovered in a granular form by filtering the solutions. The filtrate containing some unrecovered selenium in solution was ready for reuse and the filtered selenium, after drying, was in condition for further utilization in the reforming operation. In this way substantially all of the selenium consumed in the conversion operation may be recovered continuously.

In carrying out our process, caustic soda, ammonia, soda ash or equivalent alkalies may be used in any of the scrubbing operations, but caustic soda apparently functions a little more efficiently than soda ash for washing the naphtha. In general, soda ash is the most satisfactory scrubbing agent in normal operation for scrubbing either gaseous or liquid products because of the relatively high solubility of the alkali selenides therein. When using caustic soda, it is often advantageous to combine a water wash with the alkaline scrubbing operation in order to avoid precipitation of crystals which may cause plugging of lines or other pieces of the equipment. The strength of the alkaline solutions may range from about 2-15%, by weight, or higher. Also the temperature for oxidizing may range from room temperature to near the boiling points of the solutions.

In cases where it is desired to completely separate the selenium from the alkaline solutions, the filtrate, after separation of the major portion of the selenium as described above, may be acidified, for example, with a suitable acid, such as hydrochloric acid, and sulfur dioxide bubbled therethrough or some other reducing agent added to reduce any selenious acid or other oxidation products. Ordinarily, the complete separation of the selenium from the alkaline solutions is not essential to the operation of the process unless excessive amounts of unrecovered selenium compounds accumulate in the solutions.

Instead of washing the gases and naphtha separately, they may both be washed together with the same solution; and to increase the efficiency and simplicity of the operation, the scrubbing may be performed in the condensing step or prior thereto, for example, in the dephlegmator, or a separate scrubber may be installed at any suitable place ahead of the final condenser.

Although we have described a process in relation to certain theoretical reactions, it should be understood that we do not intend to limit ourselves to the correctness thereof.

Obviously, many modifications and variations of the invention, as hereinbefore set forth, may be made without departing from the spirit and scope thereof, and therefore only such limitations should be imposed as are indicated in the appended claims.

We claim:
1. The method for the recovery of selenium from hydrocarbons after subjection to a conversion operation in the presence of selenium which comprises extracting the selenium compounds from the cracked products by means of an alkali and then precipitating the selenium from the alkali by means of an oxidizing agent.

2. The method for the recovery of spent selenium in a pyrolytic cracking process in which selenium is used as a catalyst, which comprises scrubbing the volatilized products from the cracking operation with an aqueous alkali to extract the selenium compounds therein, then subjecting the alkali extract to an oxidation operation to precipitate the selenium.

3. In the conversion of hydrocarbons wherein selenium is used as a catalyst and the spent selenium is normally lost as volatile compounds in the lower boiling products, such as the naphtha and uncondensable gases, the improvement which comprises recovering the selenium by scrubbing the lower boiling products with an aqueous alkaline solution to extract the selenium from said products in the form of a salt, and then oxidizing the salt to liberate the selenium.

4. The method according to claim 3 in which the concentration of the alkali in the solution is about 2-15% by weight.

5. In the recovery of spent selenium from a hydrocarbon conversion process wherein the selenium is used as a catalyst for the conversion of the hydrocarbons, the steps of subjecting a lighter portion of the vaporized converted products containing volatile selenium compounds to a scrubbing operation with an aqueous alkali to extract the selenium as an alkali selenide soluble in the aqueous solution, then contacting air with the solution to precipitate the selenium and recovering the precipitated selenium.

6. The method according to claim 5 in which the temperature of the aqueous solution of alkali selenide when contacted with air is about 100° F.–200° F.

In witness whereof we have affixed our signatures.

CHARLES C. TOWNE.
HERBERT C. BECKER.